(No Model.)
E. BOOKHOUT.
PLUMBER'S TACK.
No. 541,420. Patented June 18, 1895.
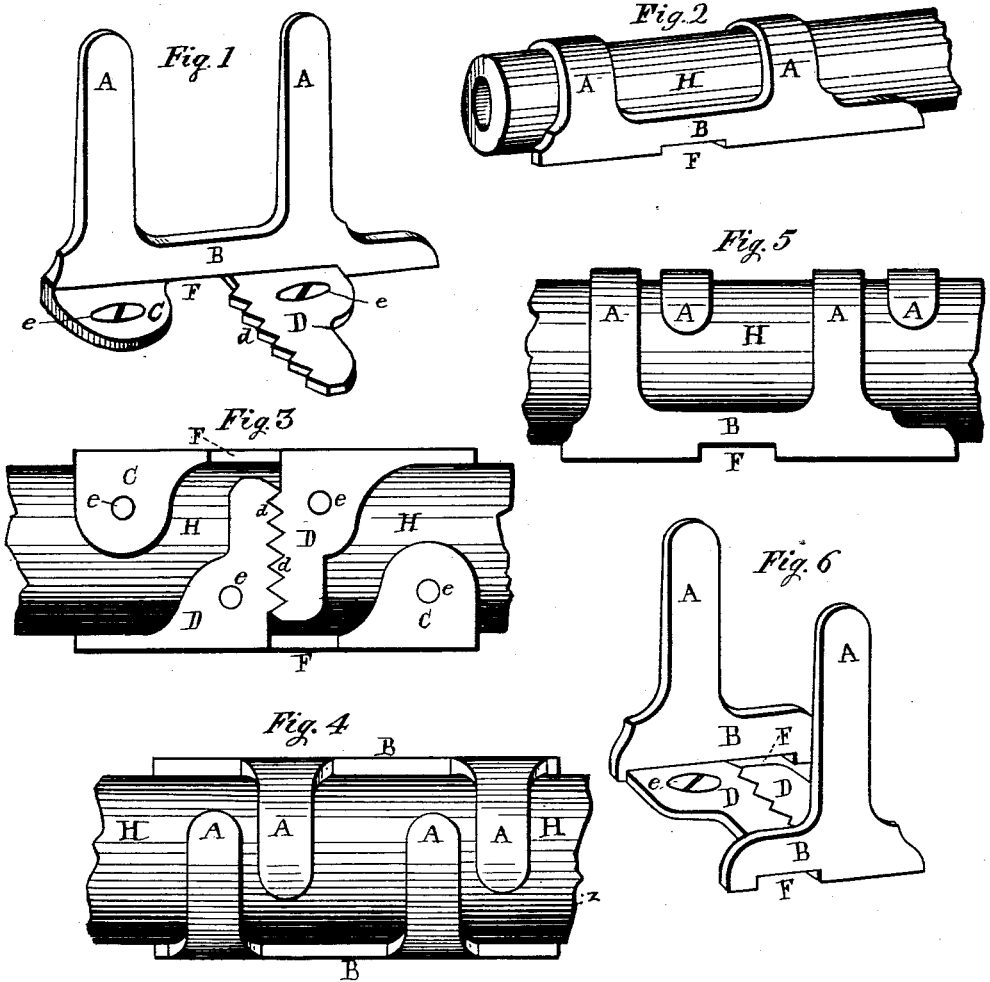
WITNESSES:
INVENTOR
Edward Bookhout

UNITED STATES PATENT OFFICE.

EDWARD BOOKHOUT, OF CRANFORD, NEW JERSEY.

PLUMBER'S TACK.

SPECIFICATION forming part of Letters Patent No. 541,420, dated June 18, 1895.

Application filed December 22, 1894. Serial No. 532,740. (No model.)

*To all whom it may concern:*

Be it known that I, EDWARD BOOKHOUT, a citizen of the United States, residing at Cranford, in the county of Union and State of New Jersey, have invented a new and useful Plumber's Tack, of which the following is a specification.

My invention relates to devices technically called plumbers' tacks, used for supporting leaden water pipes against walls, &c.; and the object of my improvement is to produce a tack, one size of which, can be used to hold pipes of any size in common use by plumbers. This tack can also, by reducing its size, be used as an intermediate between the main tacks, in place of the wooden strips usually nailed under the pipes to prevent sagging. I also avoid the clumsy screw plate, at the sides of the pipe now in general use. I also endeavor to produce a tack that will be equally as well adapted to iron pipes as to leaden pipes. I attain these objects by the means illustrated in the accompanying full sized drawings, in which—

Figure 1 is a back view in perspective, of the tack, showing the screw-plate C, a rack and screw-plate combined D, the lugs A A, connected by the base B, and rack-notch F in the bottom of the base B; Fig. 2, a perspective view of a small-sized pipe H in position and held by one tack, the lugs A A having been hammered down upon the pipe; Fig. 3, a view of the bottom side of a large-sized pipe H, held by two tacks, showing the teeth $d\ d$ of the racks D D locked; $e\ e\ e\ e$, screw-holes for securing it to support; Fig. 4, a top view of a large pipe H, held by two tacks, with lugs A A A A hammered down; Fig. 5, a side elevation of a large-sized pipe H, held by two tacks with lugs A A A A, hammered down; F, rack-notch. Fig. 6 shows a pair of intermediate tacks placed in position and screwed down ready to receive the pipe. The intermediates have only one lug A. F is rack-notch. Fig. 7 is a section of two tacks with the teeth $d\ d$ on the flat of the racks D instead of the edge.

The plates, C and D, with perforations for screws, by which the tack is secured to a wall or other support, instead of being placed outside, in view, are placed at the back of the tack, and are covered up by the pipe, leaving nothing visible but the lugs, A A, which resemble neat bands.

The racks, D D, are used to adjust the space between the tacks, when two tacks are used, to the diameter of the pipe. The teeth, $d\ d$, when locked together, cause the weight of the pipe to be divided between the screws of the upper and lower tacks. These teeth may be square, like cogs, or right-angled triangle shape, or they may be made on the flat of the rack as shown in Fig. 7, but those above described are preferred.

The lugs, A A, are allowed to remain straight till the pipe is laid in. Then they are hammered down neatly around the pipe. The two lugs, A A, are placed nearer to one end of the tack than the other, so that when there is a tack on each side of the pipe, and the lugs are hammered down, they lie side by side, Figs. 4 and 5, and by placing them as described, the tacks can all be cast from the same patterns, which, of course, makes them all alike. This economizes the plumber's time, inasmuch as when he wants a mate for one he has put in place, he has it in the first one he seizes, yet they would hold perfectly well placed differently, or a greater number of lugs could be used, but, for all ordinary purposes two are sufficient.

For intermediate tacks, one lug, Fig. 6, seems sufficient. In cases where the main tacks are very wide apart, two or more intermediates might be required under the pipe, to prevent sagging.

The rack-notch, F, is to allow the end of the rack to pass through, when two tacks are used with pipe so small, that in closing up the tacks, the racks would strike base, B, and prevent adjustment. In hanging heavy horizontal pipe, the lower tacks, both mains and intermediates, are put up first. Then the upper ones are placed as shown in Fig. 6. The pipe is then laid in and the lugs, A A are hammered down.

Having fully described my invention, what I claim as new, and desire to secure by Letters Patent, is—

1. In a plumber's tack, the combination of a base plate consisting of two parts adjustable with relation to each other, means for retaining the parts in their adjusted positions, and means attached to each part of the base for clamping the pipe in position.

2. A plumber's tack comprising in combination a base plate consisting of two parts adjustable with relation to each other, the co-operating parts of the base being serrated, means for securing the parts in their adjusted positions, and lugs attached to the base plate for securing the pipe in position.

3. A plumber's tack comprising in combination a base plate consisting of two parts adjustable with relation to each other, the co-operating edges of the base plates being serrated, means for securing the parts interlocked, and lugs attached to the base plate for securing the pipe in position.

4. A plumber's tack comprising in combination a base plate consisting of two parts adjustable with relation to each other, means for retaining the parts in their adjusted positions, and lugs attached to each part of the base for clamping the pipe in position, each lug being provided with a recess F through which the base plate of the co-operating parts may project.

5. A plumber's tack comprising a base plate, one edge of which is serrated, and a lug attached to the base plate to clasp a pipe.

6. A plumber's tack comprising in combination a base plate, one edge of which is serrated, a lug attached to the base plate for clamping a pipe, the lug being provided with a recess such as F.

EDWARD BOOKHOUT.

Witnesses:
EDWARD BOOKHOUT, Jr.,
CHARLES H. BOOKHOUT.